(12) United States Patent
Chutczer et al.

(10) Patent No.: US 8,521,806 B2
(45) Date of Patent: Aug. 27, 2013

(54) INITIATING A FILE DOWNLOAD BY A FIRST ELECTRICAL DEVICE THROUGH A SECOND ELECTRICAL DEVICE

(75) Inventors: Marc Chutczer, San Francisco, CA (US); Binh Truong, Sunnyvale, CA (US); Thomas J. Zato, Santa Clara, CA (US); Varshney Anuj, Cupertino, CA (US); Kooi L. Yap, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 936 days.

(21) Appl. No.: 11/611,001

(22) Filed: Dec. 14, 2006

(65) Prior Publication Data
US 2008/0147683 A1    Jun. 19, 2008

(51) Int. Cl.
*G06F 15/16*    (2006.01)
*H04N 7/173*    (2011.01)

(52) U.S. Cl.
USPC ........... 709/203; 709/219; 709/200; 709/207; 709/217; 709/236; 715/748; 715/747; 725/55; 725/61; 725/90; 725/135; 725/56

(58) Field of Classification Search
USPC ................................. 709/200–207, 217–237
See application file for complete search history.

(56) References Cited

U.S. PATENT DOCUMENTS

| | | | | |
|---|---|---|---|---|
| 7,539,631 | B1 * | 5/2009 | El-Haj | 705/26.1 |
| 7,698,467 | B2 * | 4/2010 | Kim et al. | 709/246 |
| 7,788,339 | B1 * | 8/2010 | Srinivasan | 709/219 |
| 2002/0046407 | A1 * | 4/2002 | Franco | 725/110 |
| 2002/0095683 | A1 * | 7/2002 | Watanabe | 725/90 |
| 2005/0138546 | A1 * | 6/2005 | AbiEzzi | 715/513 |
| 2005/0177420 | A1 * | 8/2005 | Tanahashi | 705/14 |
| 2006/0161635 | A1 * | 7/2006 | Lamkin et al. | 709/217 |
| 2007/0043739 | A1 * | 2/2007 | Takai et al. | 707/10 |
| 2007/0067812 | A1 * | 3/2007 | Watanabe | 725/90 |
| 2007/0180478 | A1 * | 8/2007 | Doi et al. | 725/87 |
| 2007/0239623 | A1 * | 10/2007 | Wang et al. | 705/77 |

FOREIGN PATENT DOCUMENTS

| | | |
|---|---|---|
| JP | 2000-200233 | 7/2000 |
| JP | 2000-215160 | 8/2000 |
| JP | 2001-005711 | 1/2001 |
| JP | 2003-114838 | 4/2003 |
| JP | 2003-319363 | 11/2003 |
| JP | 2005-173667 | 6/2005 |
| JP | 2006-163498 | 6/2006 |
| JP | 2006-203831 | 8/2006 |
| JP | 2006-301889 | 11/2006 |

* cited by examiner

*Primary Examiner* — Jude Jean Gilles

(57) ABSTRACT

A method comprises a second electrical device receiving a request via a network from a first electrical device to cause a file to be downloaded. The method further comprise the second electrical device causing the file to be downloaded from a server via the network to the second electrical device.

19 Claims, 3 Drawing Sheets

INITIATING A FILE DOWNLOAD BY A FIRST ELECTRICAL DEVICE THROUGH A SECOND ELECTRICAL DEVICE

BACKGROUND

It is common-place to download files from a server via a network such as the Internet. Upon being downloaded, the file is typically stored in some type of non-volatile storage medium (e.g., hard disk drive). Unfortunately, not all devices have enough, or any, non-volatile storage. Downloading a file to a device without non-volatile storage in which to store the downloaded file is problematic.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

Various embodiments comprise first and second electrical devices coupled to each other via a network. The first and second electrical devices can access an on-line service that contains, or otherwise has access to, downloadable files. The user may be able to select from multiple on-line services. Each on-line service has one or more files from which the user can choose for downloading. The first electrical device can be used to select a file from the on-line service. The first device, which may or may not comprise sufficient non-volatile storage for the downloaded file, causes the second device to have the file downloaded from the on-line service. As such, a user uses the first electrical device to select the desired file, but the second electrical device performs the download operation at the request of the first electrical device. Once the file is downloaded to the second electrical device, the file can be accessed by the first electrical device via the network.

An illustrative use of this technique is for downloading movies for viewing on a television. A networked television may not have sufficient, or any, non-volatile storage for storing the downloaded movie. The television is coupled over a network to a computer (or other non-volatile storage device) that can store the movie. Via the television, a user can browse one or more on-line movie services and select a movie to download. The television then causes the computer to download the requested movie. Once the movie is downloaded and stored on the computer, the user can playback the movie from the computer. During playback of the movie, the computer streams the movie over the network to the television. Moreover, the user can conveniently purchase movies from on-line services interacting directly only with the television, and thus need not directly interact with the computer to purchase the movie. The computer is used by the television during the download process, but in a manner generally transparent to the user.

Figure 1:
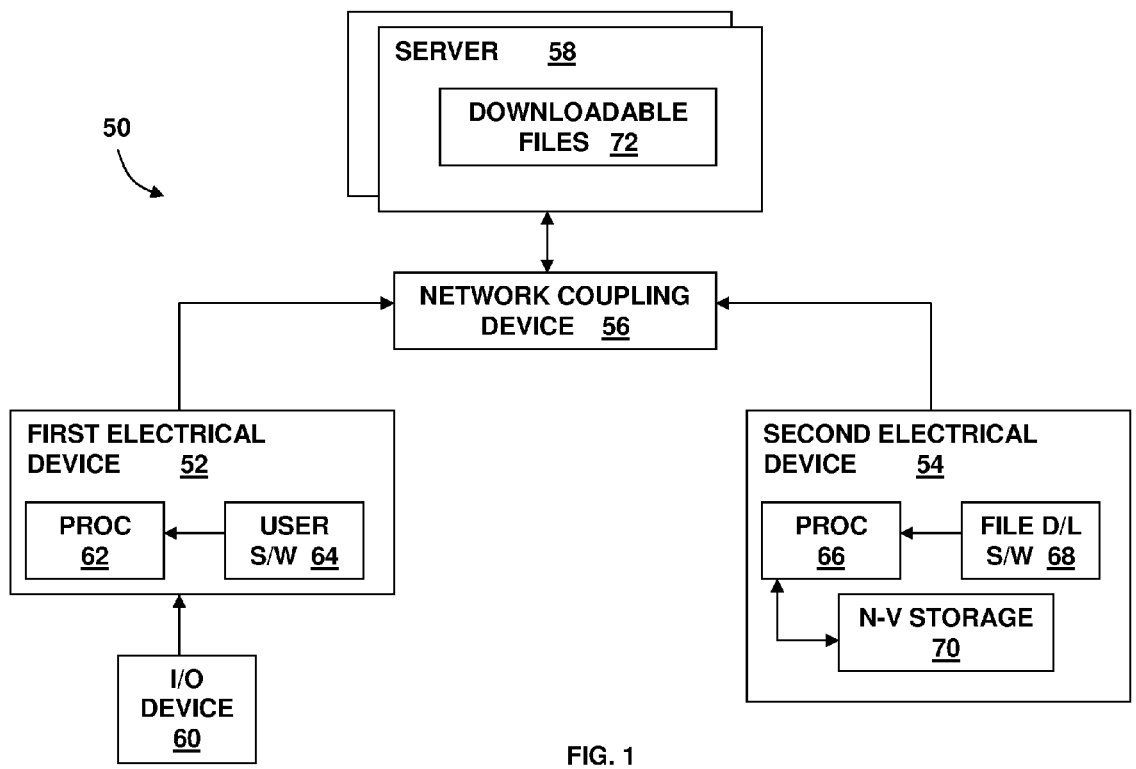
FIG. 1 shows a system in accordance with various embodiments comprising first and second electrical devices usable to select and cause a file to be downloaded from a server.

FIG. 1 shows an illustrative embodiment of a system 50 comprising first and second electrical devices 52 and 54, respectively, coupled together via a network coupling device. In one embodiment, the first electrical device comprises a television with network capability. The first electrical device 52, however, can be a device other than a television. Examples comprise a computer (desktop, notebook), a personal digital assistant (PDA), etc. The first electrical device 52 comprises a processor 62 and user software 64 that is executable by the processor 62. In accordance with at least some embodiments, the functionality performed by the first electrical device 52 is implemented, at least in part, by the processor 62 executing the user software 64.

In some embodiments, the first electrical device 52 does not contain sufficient, or any, non-volatile storage to store a downloadable file. In other embodiments, the first electrical device 52 does contain some, and perhaps sufficient, non-volatile storage to store a downloadable file, but such storage need not be used for storing the downloaded file. An input/output (I/O) device 60 is included to permit a user to operate the first electrical device 52. The I/O device 60 may comprise, for example, a remote control (e.g., wireless remote control).

In some embodiments, the second electrical device 54 comprises a computer (e.g., desktop, notebook, etc.), a network attached storage device (NAS), or another electrical device that can communicate with the first electrical device over a network. As shown in FIG. 1, the second electrical device 54 comprises a processor 66, file download software 68 that is executable by the processor 66, and non-volatile storage 70 for storing downloaded files. In accordance with at least some embodiments, the functionality performed by the second electrical device 54 is caused by the processor 66 executing the file download software 68.

Software 64 and 68 are provided on any suitable computer-readable medium. Each processor 62 and 66 can access its relevant computer-readable medium and execute the software contained thereon. Examples of suitable computer-readable media comprise volatile memory such as random access memory (RAM) and non-volatile storage such as read only memory (ROM), a hard disk drive, a compact disc read only memory (CD ROM), Flash memory, etc.

The network over which the first and second electrical devices 52 and 54 communicate can be a wired network or a wireless network. Thus, the network coupling device 56 may comprise a wired or wireless router, an access point (AP), a hub, a switch, combinations thereof or other devices suitable for implementing a network. The network may be any suitable type of network comprising, for example, a local area network (LAN) and a wide area network (WAN).

The first and second electrical devices 52 and 54 can access one or more servers 58. The servers 58 provide one or more on-line file download services. The servers 58 comprise storage for various downloadable files 72. A user of the first electrical device 52 can browse the choices of downloadable files 72 and select a downloadable file for downloading. The first electrical device 52 then commands the second electrical device 54 to download the selected file 72 from the specified server 58 and store the downloaded file on the second electrical device's non-volatile storage 70.

Figure 2:
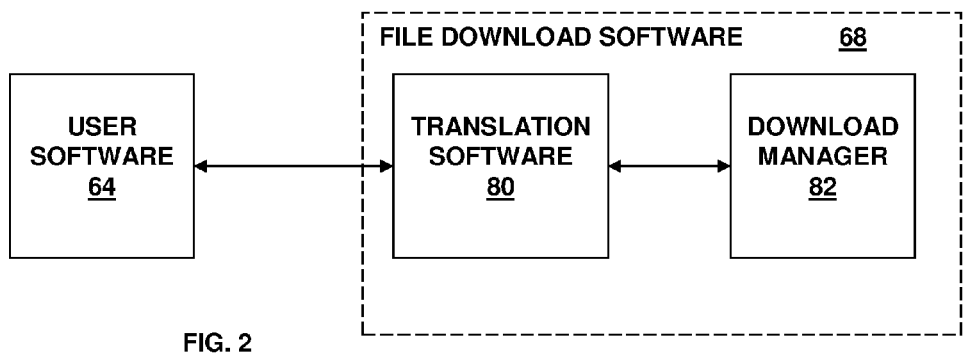
FIG. 2 shows an embodiment of software executable on the system of FIG. 1.

FIG. 2 depicts a software diagram in which the user software 64 (which executes on the first electrical device 52) interacts with the file download software 68 (which executes on the second electrical device 54). The file download software 68 interacts with the server 68 to download the file specified via the user software 64. In some embodiments, the file download software 68 is implemented as one application.

In other embodiments (such as that shown in FIG. 2), the file download software 68 is implemented as two (and in yet other embodiments, more than two) components. In the embodiment of FIG. 2, one component comprises a translation software component 80 and another component comprises a download manager component 82. The user software 64 permits a user to browse downloadable file choices from the server(s) 58 and to select one or more of the files to be downloaded. The translation software component 80 receives file download commands from the user software 64 and translates the commands to a form suitable for the download manager 82. An application programming interface (API) is implemented to which the translation software component 80 and the download managers 82 adhere. Using an API permits different companies to develop and provide the various download managers 82. For example, the company that provides a particular movie download, on-line service may also provide a corresponding download manager 82 that knows how to download files from that particular service. A different download manager 82 can be provided for each available file download, on-line service, and all such download managers 82 can correctly interact with a common translation software module 80 by using the same API.

The information that a particular download manager 82 needs to download a file requested by a user of first electrical device 52 may vary among the various file download services. In some embodiments, the download manager 82 (and the file download software 68 in general) must be informed of the identity of the server 58 on which the target file is currently stored and the identify of the file itself. The server identity may be in the form of a uniform resource locator (URL), internet protocol (IP) address, etc. The file identity may in the form of a file name. Some file download services may also require a user to authenticate himself or herself before the requested file can be downloaded. The authentication process may require the file requesting device to provide a correct password, key, or other suitable form of authentication. The download manager component 82 associated with a given file download, on-line service is configured to implement whatever authentication procedures are required by that particular on-line service. For example, a user authentication data value (e.g., a password) may be hard-coded into the download manager component 82, or provided in memory (e.g., protected memory) on the second electrical device 54 and accessible to the download manager component 82.

Figure 3:
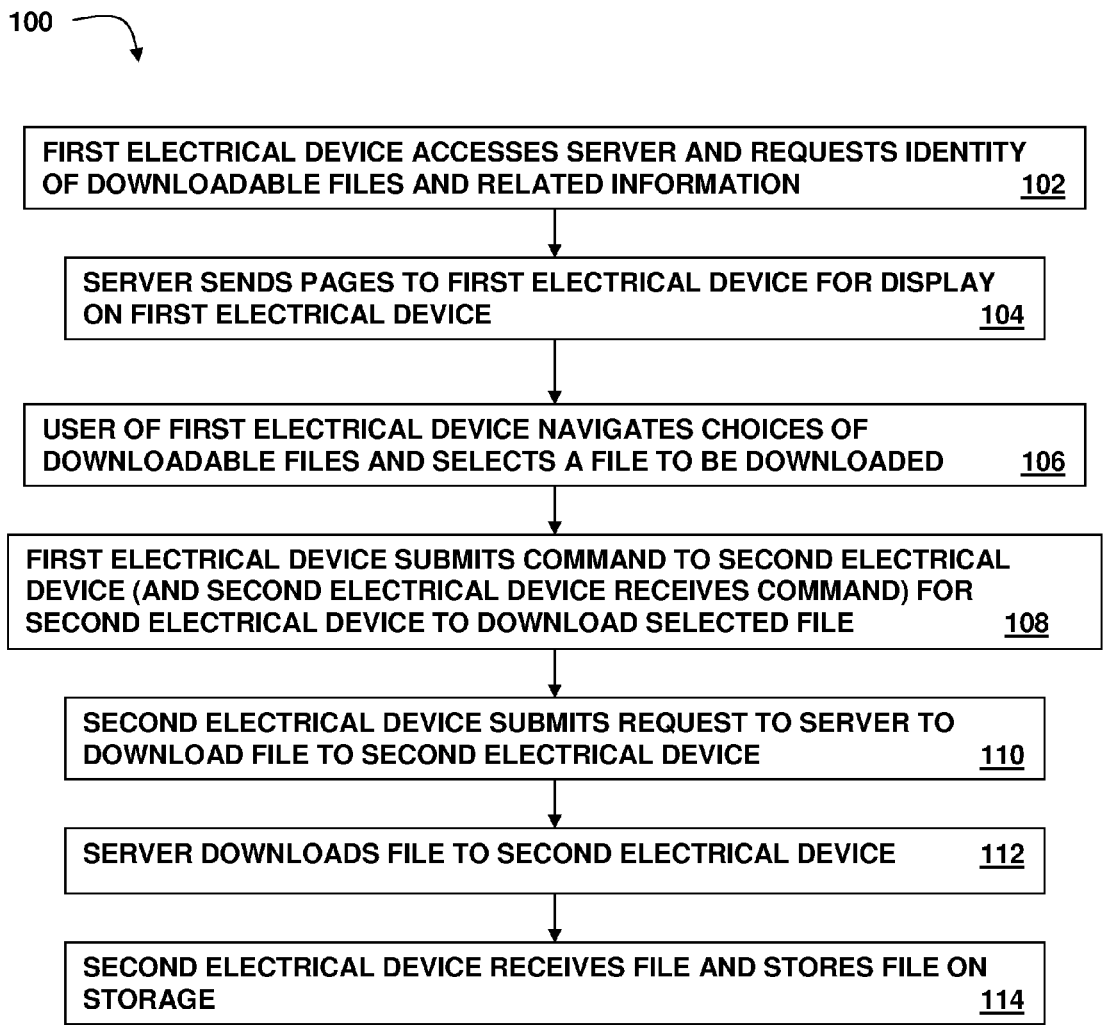
FIG. 3 illustrates a method in accordance with various embodiments in which a first electrical devices used to select a file to be downloaded by a second electrical device.

FIG. 3 illustrates a method 100 in which the first electrical device 52 is used to select a file to be downloaded by the second electrical device 54. At 102, a user of the first electrical device 52, using user software 64, causes the first electrical device to access a server 58 that contains, or provides access to, a list of downloadable files (e.g., movies). In some embodiments, the I/O device 60 may comprise a pre-defined "download" button that, when pressed causes the first electrical device 52 to display one or more on-line services from which the user can select. The user, using navigation buttons on the I/O device 60 (e.g., left/right/up/down and "OK" buttons), selects one of the displayed on-line services. In some embodiments, only one on-line service may be accessible to the user and, in such a case, the action of selecting an on-line service may be omitted.

Upon the user selecting a desired on-line service, the first electrical device 52 accesses a server 58 associated with the selected on-line service and requests the identity of the various downloadable files and related information that that particular on-line service contains. The URL of a server that provides the selected on-line service is stored in the first electrical device 52. The file identities comprise in some embodiments the names of the various downloadable files. The "related information" comprises information pertaining to the downloadable files. Such related information may comprise, for example, metadata specifying an alternative file name, file size, the running time of the file (e.g., the amount of time a movie takes to play), etc.

At 104, the server 58 sends the user software 64 the requested information (file names and related information). The requested information is generated by the server 58 and provided to the first electrical device 52 in the form of one or more web pages. As such, the user of the first electrical device 52 accesses the on-line service via a user interface that has the "look and feel" of Internet browsing using a browser. As noted above, the first electrical device 52 may comprise a television and, as such, the user may be sitting a significant distance away (e.g., 10 feet) compared to a user of a computer (typically three feet away or less). In some embodiments, the pages provided by the server 58 are customized for a user that is assumed to be sitting a significant distance away from the display of the first electrical device. Customization of such pages may comprise, for example, the use of a font of a sufficient size to be easily readable from a distance of, say, 10 feet.

At 106, the user of the first electrical device 52 uses the I/O device 60 to navigate the displayed choices of downloadable files and to select a file to be downloaded. Once the file choice has been made, at 108 the first electrical device 52 submits a command over the network to the second electrical device 54 for the second electrical device 54 to download the selected file. The second electrical device 54 receives and processes the command accordingly. The command comprises whatever information is needed by the file download software 68 executing on the second electrical device 54 to cause the target file to be downloaded. Such information comprises, in some embodiments, a file name and a URL of the server 58 that contains or otherwise has access to the target file. The information may also comprise a value used by the on-line service to authenticate the request and/or the source of the request. The URL of the appropriate server 58 may be provided by the first electrical device 52 to the second electrical device 54.

As part of the file navigation and selection process, the server 58 to which the first electrical device 52 is currently accessing streams a small portion of the file to the first electrical device 52 for direct playback (i.e., without storing the file on the first electrical device). In the case of movies, a short clip of the movie can be streamed to the first electrical device 52 (e.g., television). Such clips may help the user make a decision about which files to download.

In embodiments in which the download manager components 82 are separate from the translation software component 80, the translation software component 80 determines which download manager 82 to use to access and download the user-requested file. The translation software component 80 determines the download manager to use based on, for example, the name of the on-line service selected by the user, the URL of the selected on-line service, or by other means.

At 110, the download software 68 (and, in some embodiments, the download manager 82) executing on the second electrical device 54 submits a request to the appropriate server 58 to download the target file to the second electrical device. The server 58 responds to the request and at 112 downloads the requested file to the second electrical device 54. In some embodiments, the downloaded file is compressed and/or encrypted, while in other embodiments the downloaded file is not compressed or encrypted.

Depending on the file size, it may take more than a trivial amount of time to download the file. While the file is being downloaded, the first electrical device 52 provides download status to the user. In an illustrative embodiment, the first electrical device 52 submits a command over the network to the second electrical device 54 to provide a status of the download process. The file download software 68 examines the related file information (e.g., metadata) to determine the size of the file being downloaded, determines how much of the file has already been downloaded, and computes a status value that indicates the status of the download process. The file download software 68 provides the status value to the user software 64 of the first electrical device 52. The first electrical device displays the status value or a graphic representative of the status value. In some embodiments, the status value is, or represents, a "percentage complete" value. The user software 64 can display the percentage complete value in numerical form or generate a bar (or equivalent) graphic representation of the percentage complete value. In some embodiments, the first electrical device 52 periodically requests the status update of the download process. The period may be n (e.g., every 5) seconds.

At 114, the second electrical device receives the file and stores the file on its non-volatile storage 70. In accordance with some embodiments, the downloaded files are stored in a predetermined directory or folder for ease of subsequent processing and retrieval by the second electrical device 54.

Figure 4:
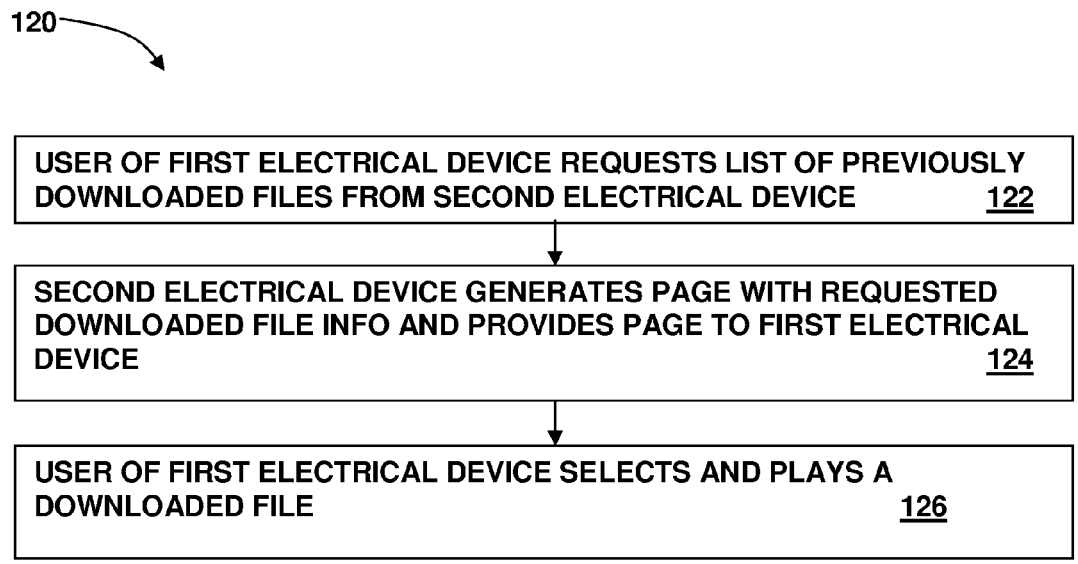
FIG. 4 depicts the operation of the first and second electrical devices during playback of the previously downloaded file.

FIG. 4 shows a method 120 which illustrates the operation of the first and second electrical devices during playback of the previously downloaded file. At 122, the user of the first electrical device 52 requests a list to be displayed on the first electrical device of files previously downloaded to the second electrical device 54. This action can be initiated, for example, by the user pressing a button on I/O device 60. The first electrical device 52 responds by generating and providing a command to the second electrical device 54. At 124, the second electrical device receives the command from the first electrical device 52 and generates, for example, a page containing the requested downloaded file information. The downloaded file information is gathered by the second electrical device (e.g., by download software 68) by examining the names of the previously downloaded files and/or the associated file information (e.g., metadata). The second electrical device 54 provides the page to the first electrical device 52 which then displays the received page. At 126, the user of the first electrical device 52 scrolls through the list of choices and selects a file to be played on the first electrical device. Playback of the file may comprise the second electrical device 54 streaming the file over the network to the first electrical device 52.

In at least some embodiments, the user pays for a file the user desires to download. In some such embodiments, the user pre-registers with the on-line service via any suitable Internet-connected computing device to set-up an account. The financial transaction may then be automatically charged to that user's account. When the second electrical device 54 accesses the target server, the second electrical device provides a piece of information that enables the server to identify the user. The financial transaction may then be automatically charged to that user's account.

In accordance with some embodiments, the servers 58 contain the downloadable files. In other embodiments, a server 58 provides a "gateway" through which access to other servers containing the downloadable files can be accessed.

The above discussion is meant to be illustrative of the principles and various embodiments of the present invention. Numerous variations and modifications will become apparent to those skilled in the art once the above disclosure is fully appreciated. The file to be downloaded can contain information other than a movie, such as data. It is intended that the following claims be interpreted to embrace all such variations and modifications.

What is claimed is:

1. A method, comprising:
receiving, by a second electrical device, a request via a network from a first electrical device to cause a file to be downloaded, wherein the first electrical device does not contain sufficient non-volatile storage to store the file to be downloaded and the first electrical device provides a user interface to permit a user to select the file to be downloaded;
causing, by the second electrical device, said file to be downloaded from a server via said network to the second electrical device;
storing the file on the second electrical device; and
streaming the file from the second electrical device to the first electrical device for playback on the first electrical device.

2. The method of claim 1 further comprising requesting, by the first electrical device, identities of downloadable files from said server.

3. The method of claim 1 further comprising sending, by the server, user interface pages to the first electrical device identifying a set of downloadable files.

4. The method of claim 1 further comprising submitting, by the first electrical device, the request to the second electrical device, said request indicating an identity of the file to be downloaded.

5. The method of claim 1 further comprising submitting, by the first electrical device the request to the second electrical device, said request indicating an identity of the file to be downloaded and an identity of the server.

6. The method of claim 1 further comprising downloading, by the server, said file to the second electrical device.

7. The method of claim 1 further comprising providing, by the first electrical device, a user a plurality of choices of on-line services from which to download a file.

8. A system, comprising:
a first electrical device providing a user interface to a user, wherein said first electrical device does not contain sufficient non-volatile storage to store any of said downloadable files;
a second electrical device communicatively coupled to the first electrical device via a network;

wherein said first electrical device receives a plurality of identities of downloadable files from a server, receives a selection of a downloadable file by a user through the user interface on the first electrical device, and provides a request via the network to the second electrical device to cause the second electrical device to thereby initiate a download of the selected downloadable file from the server to the second electrical device; and wherein said second electrical device downloads the selected downloadable file, stores the file on said second electrical device, and then streams the file to the first electrical device for playback on the first electrical device.

9. The system of claim 8 wherein said first electrical device comprises a television.

10. The system of claim 8 wherein said first electrical device comprises a television and said second electrical device comprises a computer.

11. The system of claim 8 wherein said files comprise movies.

12. The system of claim 8 wherein said request comprises an identity of an on-line service accessible to said server from which the second electrical device initiates said file download.

13. The system of claim 8 wherein said first electrical device receives a page from said server, said page containing said plurality of downloadable file identities and a selectable link associated each identity, and each selectable link containing a variable field.

14. The system of claim 13 wherein said first electrical device fills in an address of the second electrical device in at least one selectable link in said page.

15. The system of claim 8 wherein said first electrical device comprises a television that receives web pages from the server, the web pages containing the downloadable file identities and, via a remote control associated with said television, the television enables a user to select one of said downloadable file identities.

16. The system of claim 8 wherein said first electrical device file requests said file to be streamed by said second electrical to said first electrical device and causes said file to be played on said first electrical device.

17. A computer-readable medium comprising software that, when executed by a processor of a second device, causes the processor to:

receive a command from a first device via a network, said command containing an identity of a file to be downloaded from a server, wherein said first device does not contain sufficient non-volatile storage to store the file to be downloaded;

initiate downloading of said file from the server to the second electrical device;

store said file on said second electrical device; and stream said stored file to said first electrical device for playback on the first electrical device.

18. The computer-readable medium of claim 17 wherein said software further causes said processor to generate a page containing identities of previously downloaded files.

19. The computer-readable medium of claim 18 wherein said software further causes said processor to provide said page to said first electrical device.

* * * * *